United States Patent [19]

Knight

[11] Patent Number: 5,229,437
[45] Date of Patent: Jul. 20, 1993

[54] ENCAPSULATING MATERIAL FOR ASBESTOS TILE

[75] Inventor: William O. Knight, Baltimore, Md.

[73] Assignee: The Gibson-Homans Company, Twinsburg, Ohio

[21] Appl. No.: 815,491

[22] Filed: Dec. 31, 1991

[51] Int. Cl.$^5$ ............................................. C08J 9/32
[52] U.S. Cl. ................................... 523/219; 523/218; 427/207.1; 427/388.4; 427/407.1; 427/412.1; 427/393.6; 524/494
[58] Field of Search ............... 523/218, 219; 524/494; 427/207.1, 388.4, 407.1, 412.1, 393.6

[56] References Cited

U.S. PATENT DOCUMENTS

| | | | |
|---|---|---|---|
| 3,407,165 | 10/1968 | Oepkes et al. | 523/218 |
| 4,064,294 | 12/1977 | Babil et al. | 427/294 |
| 4,101,501 | 7/1978 | Hinterwaldner | 523/205 |
| 4,159,912 | 7/1979 | Jorgenson | 106/735 |
| 4,209,562 | 6/1980 | Suwala et al. | 428/271 |
| 4,246,155 | 1/1981 | Meath et al. | 524/452 |
| 4,380,595 | 4/1983 | Arpin | 524/5 |
| 4,477,490 | 10/1984 | Weisberg | 427/136 |
| 4,489,109 | 12/1984 | Puskar | 427/230 |
| 4,565,577 | 1/1986 | Burkhardt et al. | 106/677 |
| 4,605,570 | 8/1986 | Felter et al. | 427/386 |
| 4,632,847 | 12/1986 | Lomasney et al. | 588/249 |
| 4,693,755 | 9/1987 | Erzinger | 134/4 |
| 4,828,883 | 5/1989 | Ramun | 427/214 |
| 4,866,105 | 9/1989 | Batdorf | 523/103 |
| 5,019,195 | 5/1991 | Skinner | 156/71 |

OTHER PUBLICATIONS

Keeping Pace Feb. 1990.
A Look at Encapsulation "Environmental Contractor" Dec. 1990.
ASTM D 3808-79 (Reapproved 1984).
Two-Trowel Technique Designed to Save Installer's Time With New 'Leveler' "Floor Covering Weekly".

*Primary Examiner*—Paul R. Michl
*Assistant Examiner*—John J. Guarriello
*Attorney, Agent, or Firm*—Fay, Sharpe, Beall, Fagan, Minnich & McKee

[57] ABSTRACT

A self-levelling continuous coating composition is disclosed. The composition is adapted for application on a surface of flooring material which contains asbestos. The composition encapsulates the hazardous material there in the floor and allows the addition of another layer of flooring to be installed thereover. The composition is comprised of about 40-55 parts by weight of a latex emulsion binder; about 2-7 parts by weight antifreeze; about 38-53 parts by weight hollow ceramic microspheres; and about 6-16 parts by weight water. The resulting composition can be applied in a single step application and does not require mixing of separate ingredients at the workplace.

18 Claims, No Drawings

ENCAPSULATING MATERIAL FOR ASBESTOS TILE

BACKGROUND OF THE INVENTION

This invention pertains to the art of protective coatings, and more particularly to the art of protective coatings for flooring tiles containing hazardous materials. It will be appreciated, however, that the invention has broader applications and may be advantageously employed in other environments such as in connection with coating non-flooring surfaces.

Many preexisting floors contain materials which have in recent years been determined to be hazardous. Asbestos, a known carcinogen, is among the more prevalent hazardous materials found in flooring. Removing asbestos materials from existing structures has become a rather undesirable undertaking for health, safety and economic reasons. Extreme care must be taken during its removal to avoid contact or ingestion by humans.

In an effort to avoid the hazards and expense involved with removing asbestos flooring, it has become known to encapsulate asbestos-containing floors with encapsulating or coating materials having qualities which allow for safely maintaining existing flooring in place. While known encapsulating materials offer many benefits, as will be discussed below, prior art encapsulating materials are not without disadvantages.

For example many of the encapsulants for coating existing materials must be mixed or prepared at the work site. This can lead to a lack of consistency of the encapsulant, and substantially reduce the encapsulant's effectiveness.

In addition, encapsulating materials of the prior art typically require multiple steps in application. Those which have been known to require a single step application are comprised of an elastomeric polymer-moisture cured polyurethane. These, however, have proven to have a very short shelf life. Moreover, these moisture cured polyurethanes do not provide encapsulating properties until they are covered with a layer of sheet goods.

The EPA has issued a number of minimum requirements which must be met for asbestos encapsulating materials. For example, the EPA requires that asbestos fibers be sealed or locked in by either bridging over the surface, or penetrating into the matrix of the asbestos containing material. The encapsulator is not to include any toxic substances, nor should it reduce significantly the fire retardant properties of the underlying material. The encapsulating materials are to be applied with a minimum of effort and technical skill, and must have a sufficient impact resistance, flexibility, and resistance to penetration in order to withstand moderate physical contact. In addition, it is important that the resulting encapsulating composition be water insoluble once it has been cured, and that it is non-toxic and without noxious fumes during application. Finally, among the requirements set forth by the EPA, the encapsulating compound should have aging characteristics which permit it to withstand normal atmosphere changes for a minimum of six years while still maintaining sufficient surface integrity to allow recoating.

The material of the present invention meets and/or exceeds all of the requirements outlined above as propounded by the EPA.

With the above requirements in mind, it is desirable that an encapsulating material be developed which offers ease of installation, i.e., one that permits a single step application. Since the existing flooring may be uneven and full of imperfections, dents and ridges, it is desirable that the encapsulating compound be self-levelling. Also, the encapsulant should be one that will permit the installation of a new layer of flooring thereon such that it will bond with the adhesive used in installing the new flooring.

The encapsulating material should be capable of forming a continuous sheet to prevent asbestos exposure. Along these lines, the material should be sufficiently strong to prevent wear and, thus, re-exposure of asbestos.

Finally, it is desirable to develop an encapsulating material having a reasonable shelf life.

The present invention contemplates a new and improved encapsulating compound which overcomes all of the above-referred problems and others and provides a self-levelling, continuous asbestos encapsulating compound which is an economical alternative to removing existing flooring.

The formulation provides a permanent coating which adheres firmly to the surface of flooring materials to seal in any hazardous materials such as asbestos. The formulation provides a strong, water resistant, nonporous coating which does not require combination with other products before use. Moreover, the coating formulation eliminates the need to dispose of hazardous waste and does not interfere with the drying of subsequent flooring layers added thereto. The composition requires a minimal effort to spread, and minimal surface preparation before application. Finally, the product provides an easy clean up.

BRIEF DESCRIPTION OF THE INVENTION

In accordance with the present invention, there is provided a self-levelling continuous coating composition adapted for application on a surface of flooring material containing a hazardous substrate, such as asbestos, in order to encapsulate the hazardous material therein.

In accordance with a more limited aspect of the invention, a self-levelling continuous coating composition is provided. The coating composition can be applied in a single step to a surface of flooring material which contains asbestos. The encapsulating material coats the existing flooring and is sufficiently strong to prevent wearing away and re-exposure of asbestos. The composition permits the installation of a new layer of flooring material over the old asbestos-containing flooring.

The composition comprises about 40-55 parts by weight of a liquid latex emulsion binder, about 2-7 parts by weight of antifreeze, about 38-53 parts by weight of hollow ceramic microspheres and about 6-16 parts by weight of water. Additional components of the composition may include surfactants such as emulsifiers and wetting agents, an anti-foaming agent, a preservative, a coalescing agent and a plasticizer. The components are all mixed together and applied to a preexisting asbestos-containing floor in a single step application.

A principal advantage of the invention is that it provides an economical method for asbestos abatement that ensures health and safety, and is economically desirable.

Another advantage of the present invention is that it offers a simple alternative to asbestos removal. It can be applied to existing flooring in a single step, and new flooring can be installed thereon.

Yet another advantage of the present invention is that it provides an encapsulating material that is continuous and self-levelling.

Still other advantages and benefits of the invention will become apparent to those skilled in the art upon a reading and understanding of the following detailed description.

DETAILED DESCRIPTION OF THE INVENTION

The present invention is directed to an asbestos encapsulator. The asbestos encapsulator could likewise be referred to as a tile encapsulator, embossing leveler or liquid underlayment for reasons which will become more apparent in the following discussion.

As stated above, worn out tile or resilient floor covering which contains asbestos must be replaced. Since asbestos is a carcinogen, the Environmental Protection Agency has mandated that whenever asbestos is being handled, certain precautions must be taken to protect workers as well as the environment. Such safeguards apply to a number of situations including the removal of asbestos floor coverings. The removal and disposal of such hazardous material is very dangerous and expensive.

Manufacturers of resilient floor coverings are, therefore, now recommending that existing asbestos-containing floors be left in place. They also suggest that an embossed asbestos-containing floor be filled with a skim coat of embossing leveller followed by sealing the asbestos with a layer of resilient floor covering.

Unfortunately, when the new floor covering wears through, the original asbestos containing material is exposed. The asbestos encapsulator of the present invention prevents the re-exposure of the asbestos surface by forming a thick continuous film. The barrier film is then covered with new tile or resilient floor covering.

The encapsulating material of the present invention provides for a single step application. Unlike many of the prior art compositions, mixing of two or more components is not required.

In addition, the encapsulator of the present invention is self-levelling. It needs only to be spread to cover the surface. There is no need for troweling to form a smooth surface. The rheology of the product allows it to slowly flow to a smooth surface.

Furthermore, the encapsulating product of the present invention can be applied in thick or thin coats. In areas where tiles are missing or the situation otherwise requires, a coating can be applied up to as thick as ⅜ of an inch without adverse effect, except for an increase in drying time.

The coating can be applied to thicknesses ranging from about 1/32 to ⅜ of an inch. At thicknesses over ⅜ of an inch, however, the coating should be allowed at least seventy two (72) hours of drying time. Applications over ¼ inch may call for as much as seven days to set. Since prolonged drying times beyond seven days are impractical, it is recommended that thick coats be applied in separate layers. A desirable application thickness falls in the range of about 1/16 to ¼ inch, although a wet film thickness of about ⅛ inch is preferred. Thickness can be increased economically by applying a latex modified cement product or underlayment cement on top of the encapsulator.

The product sets firm in about 4 to 5 hours, although it is recommended that 24-48 hours elapse before physical pressure (such as walking) is applied. Under normal conditions, new flooring such as tile, vinyl floor covering or carpeting, can be installed over the dried coating after 48 hours of drying time. Conditions which inhibit the evaporation of water, such as low temperature, high humidity, thick film and lack of ventilation, will reduce the rate of drying. Conversely, conditions which promote evaporation of water will increase the rate of drying.

The encapsulator is not prone to cracking, porosity or other film property deterioration which one might expect to see in the prior art encapsulating coatings. Moreover, the encapsulating composition of the present invention is both strong and flexible. While floor coating is typically strong enough to bear heavy loads, the encapsulator of the present invention offers added built-in impact resistance and flexibility. The ability of a thick film to be flexible enough to respond to normal expansion, contraction and twisting is the result of using a latex resin, and is augmented by ceramic microspheres present in the composition.

Still further, the encapsulator product of the present invention does not interfere with the drying of pressure sensitive adhesives. That is, many pressure sensitive adhesives (PSAs) lose a substantial part of their dry tack when applied over cementitious products. The use of PSAs is preferred for installing tile over tile.

Another important advantage of the encapsulating material of the present invention is that it provides a continuous film. Any discontinuities would be undesirable as they would provide areas where asbestos could be exposed and would be able to escape. In other words, unlike e.g., cement, the composition of the present invention is not prone to cracking and is not porous.

The encapsulant can be applied to a variety of flooring materials including vinyl tile, vinyl sheet goods, rubber tile, wooden floors, and concrete or cement floors. It is recommended that the floor be thoroughly cleaned before applying the encapsulating coating.

It is fully within the scope of the present invention to use the coating for a variety of purposes other than as an encapsulant. For instance, it can be used as a fire retardant coating, or as a thermal barrier to provide a low grade insulation. Another use for the composition is as an adhesive for use in connection with wood, vinyl or concrete, or simply as a coating for cement (e.g., for patching). Finally, the composition may find usefulness as a dip coating for wood, such as structural building timber.

As stated, the encapsulating material of the present invention calls for a variety of ingredients including binders, antifreeze, hollow ceramic microspheres and water. Additional ingredients such as surfactants, antifoaming agents, preservatives, coalescing agents and plasticizers can also be added in relatively small amounts.

The encapsulator properties can be modified by altering the preparations of the ingredients over a wide range. The properties, which can be altered, include viscosity and flow, hardness and flexibility, color and appearance, filling properties, freeze-thaw stability, coalescence, cohesion, film toughness, film adhesion, density, freedom from bubbles and practical coating thickness. A modification of one property is likely to result in a change in other properties.

Certain qualities of the encapsulator can be adjusted according to the material to be coated. For example, the composition can be made softer or more flexible if the flooring to be coated is wood. For concrete, it can be made harder by removing the plasticizer and/or changing to a polymer having a higher glass transition temperature. Also, the coating can be made tougher and more impact resistant by switching to a more cohesive polymer such as Neoprene. The cost can be reduced by adding calcium carbonate which makes the coating harder and more brittle.

The resulting formulation may be one having a solid color. In the alternative, it may be given a speckled appearance. The speckled appearance can be achieved by mixing two or more colors or blending with white. The speckled effect is unusual and probably results from a relatively large size of microspheres compared to normal paint pigments. This unusual property is noted for its artistic value only. For example, a mixture of five parts white to one part red creates a unique product which attracts the attention of future workers. That is, the pattern of the colors would provide a warning that a hazardous material such as asbestos is located underneath the coating.

A binder is present in the formulation at an amount of about 40–55 weight % of the overall formulation. The binder is preferably a latex emulsion binder. A preferred binder is polyvinyl acetate homopolymer emulsion, although other latex binding materials such as polychloroprene, acrylics, ethylene vinyl acetate, vinyl acrylic, acrylonitrile, terpolymers and copolymeric compositions can be used.

The choice of latex emulsion binder is determinative of many of the final properties of the encapsulant, such as adhesion to vinyl tile, cement or wood. Generally, binders having a glass transition temperature ($T_g$) in a range of $-5°$ C. to $55°$ C. serve to provide ample hardness in relation to flexibility. Binders having lower glass transition temperatures are relatively flexible, while those of higher glass transition temperatures are more brittle. Water resistance, toughness, chemical resistance, impact resistance, shelf life and durability of the coating are a function of the chemical composition of the binder.

Microspheres such as hollow ceramic microspheres comprise about 38–53% by weight of the overall encapsulating formulation. The microspheres act analagously to ball bearings in that they offer the encapsulant desired flexibility. Microspheres are hollow ceramic spheres which are chosen because they provide the most desirable level of flow at the highest solids content. The inert composition, particle size, strength and low oil absorption qualities are important attributes which make the microspheres desirable. Microspheres range from 0–300 microns in diameter and have a compression strength of about 3500 psi. If desired, conventional pigments can be substituted for the microspheres.

Pigmentation determines to a large extent the solids volume of the coating. By selecting pigments having low oil absorption, a greater amount of pigment can be added to the encapsulating composition while still maintaining a reasonable viscosity and a suitable dry film. Ceramic microspheres and glass beads have very low oil absorption and offer such desirable properties as strength, crush resistance, inertness, tight packing, and uniformity in size. Glass beads are often used in conjunction with other pigments as certain adhesives do not bond well with glass. Other pigments may be used to lower cost, change color, adjust viscosity, reduce gloss, and conceal surface imperfections.

Antifreeze is present in about 2–7% by weight of the overall composition. Antifreeze products assist in stabilizing the finish coating during freeze-thaw cycles by lowering the temperature at which a coating will freeze. They also influence the rate of drying.

Glycols perform the dual purpose of acting as freeze/thaw additives and assisting to maintain a wet edge on the coating. Ethylene glycol is generally considered the most effective antifreeze component for the coating composition, although it is comparitively expensive.

It is important that excessive amounts of glycol are not added. Too much glycol tends to slow the thorough drying of a thick coating and will sometimes leave an oily film on the coating surface, particularly in humid conditions.

Aside from ethylene glycol, the most commonly used antifreezes are propylene glycol, glycol ethers, glycol ether acetates and alcohols.

Water comprises roughly 6–16% by weight of the encapsulating formulation. The purpose of water is to decrease the viscosity of the resulting composition to enable the encapsulating coating to spread across a floor with relative ease. One could, of course, conceivably eliminate water as a part of the formulation and just include additional antifreeze. Thus the material would comprise only binder, microspheres and antifreeze. However, it is anticipated that with this type of formulation the coating would take too long to dry. In addition, the coating may not flow very well and thus may not be completely self-levelling. In other words, the water helps to speed the drying process of the composition and also enables the composition to flow better.

In addition to the above components, the formulation may include 0–2% by weight of an emulsifier surfactant such as octylphenoxy-polyethoxy-ethanol. Also, about 0–2% by weight of a wetting agent surfactant such as sodium zinc phosphate inorganic polymer may be included. Surfactants aid in wetting and dispersing the pigment and wetting the surface of the substrate. Some surfactants improve wetting by emulsifying residual grease, oils and waxes which may remain after cleaning the floor. Excessive amounts of surfactants may cause foaming and loss of water.

A defoamer or anti-foam agent such as petroleum hydrocarbon may be present up to about 2% by weight of the overall formulation. As the name implies, defoamers reduce the foam or bubbles entrapped in the composition. Excessive amounts may promote adhesion loss, so it is desirable to use the least amount of defoamer which is effective. Some defoaming agents lose strength upon aging.

Up to about 2% by weight of a preservative such as dimethoxane may likewise be included in the encapsulating compositon. The preservative acts as a bacteriostat or fungistat. Bacteria, enzymes and fungus attempt to grow on or in a coating while the coating is stored in its container, or after it has been applied and dried. In addition, the preservative serves to improve the shelf life of the encapsulator. The compound has a shelf life of at least one year, although it is estimated that the shelf life may be as great as ten or twenty years.

The choice of which preservative to use depends on the selection of binder, economics, and government regulations. Any preservative or combination of preservatives that provides desired results is likely to be satisfactory for use in the encapsulant composition. Sodium benzoate and benzoic acid, for example, are both effective at pHs of about 3–4. Mercurials, although toxic, provide desired results. Phenylmercuric acetate is an example of a mercurial which provides desired results.

In addition, phenols can be used as preservatives. Such phenols include sodium-O-phenylphenate and O-phenylphenol. However, both of these products lose their potency upon storage. Pentachlorophenyl and 2,2 methylene bis (4-chlorophenol) can be effective in certain formulas.

Halogen containing compounds can also be used as preservatives. Bromine compounds, though effective, are expensive. An example of a chlorine containing preservative product is hexachlorodimethylsulfone. Products containing iodine such as 3-iodo-2-propenyl butyl carbamate and di-iodomethyl-p-tolysufone have limited toxicology.

Nitrogen containing compounds such as 2-(hydroxmethyl) amino ethanol, 2-[(hydroxymethyl)amino]-2-methyl propanol, 1-(3-chloroally-3, 5, 7-triaza-1-azoniaadamantane chloride and 1,2,-dibromo-2,4-dicyanobutane can be cost effective preservatives.

Dimethoxanes such as 6-actoxy-2,4-dimethyl-m-dioxane are also useful as preservatives though expensive.

Formaldehyde and products which release formaldehyde are also effective preservatives. Formaldehyde is, however, a suspected mutagen and carcinogen, and is increasingly becoming subject to government regulation. For these reasons, formaldehyde may be a less desirable preservative.

Coalescing agents are materials which aid the latex emulsion particles in flowing together to form a complete or continuous film. A variety of coalescents, each having its own evaporation rate and solvency, are available for use in the encapsulating composition. The selected coalescent should be strong enough to cause the particles of emulsion to flow together. In addition, a suitable amount of the coalescent should remain after nearly all the water has evaporated. Too much or too strong a coalescent may cause gellation during freeze-thaw or upon aging.

Coalescents become increasingly important as the glass transition temperature ($T_g$) of the binder increases. They are available in many forms such as esters, alcohols, aliphatic hydrocarbons, aromatic hydrocarbons, ethers, etc. Up to about 3% by weight of a coalescing agent such as a combination of ethylene glycol phenyl ether (90%) and diethylene glycol phenyl ether (10%) may be present in the resulting compositon.

Surfactants provide a broad class of compounds which can be used alone or in combination to modify the surface of the pigment and the surface of the product being coated. Surfactants can include, among others, phosphate esters, alkyl phenols, salts of polymeric carboxylic acid and alkyl aryl polyether alcohols. This list does not include all the possibilities and is only provided by way of example.

Plasticizers provide an optional ingredient to the encapsulator formula. Up to about 3% by weight of a plasticizer such as dipropylene glycol dibenzoate may be added to give the coating a degree of flexibility. It should be noted that any plasticizing product which is compatible with the binder can be used in any amount which does not produce unwanted side effects. Plasticizers which may be used include, but are not limited to, glycerine, soft latexes, diethylene glycol dibenzoate, dipropylene glycol dibenzoate, nondrying oils, etc.

A thickener can be added to the formulation to create a product which can be applied to sloped or uneven surfaces where retention of the slope is desired. Any thickener which serves to provide desired thickening results can be used. Thickeners can be included to up to 3 percent of the composition. Of course, one way to thicken the product is to decrease the water content of the product. As the viscosity increases, flow decreases. High viscosity produces a product which can be applied to inclined surfaces.

Associative thickeners (of up to 2% of the composition) are among those which provide desired results. Associative thickeners are liquids which can be added at the job site or during manufacture. The addition of a thickener to the formulation creates a product having a troweling consistency. Other thickeners which could be used include protein thickeners such as Casein, and certain cellulose derivatives (of up to 1% of the composition) such as hydroxyethylcellulose. Acrylic polymers such as sodiumpolyacrylate and polyacrylic acid, polysaccharides, fumed silicas and expandable clays such as montmorillonite (MMT) and attapulgite may likewise be added.

Some prior art coatings retard the spread of flames by not continuing to burn when the source of ignition is removed. Intumescent coatings add the property of keeping the coated surface from burning by forming a thermal barrier. The result is that a charred coating must be removed when the fire is extinguished.

The encapsulator material of the present invention has flame retardant properties and shows signs of acting as a thermal barrier without the need to char. While the encapsulator compound does not contain any of the typical fire retarding agents known in the art, it has been found through testing to provide flame retardant properties. More specifically, a propane blow torch was held on the composition for thirty seconds. As soon as the blow torch was removed, the fire in the composition went out. While there was some charring of the material, there was no continuation of the burn. Accordingly, it is believed that the composition has fire resistant or fire retardant properties.

Enhanced fire retardant properties can be obtained, if desired, with the addition of antimony oxide and a chlorine source like a chlorinated hydrocarbon. Pigments often found in fire retardant coatings are zinc borate, sodium borate, antimony silicon oxide, antimony oxide, halogenated hydrocarbon, alumina trihydrate, phosphates, phosphate esters, halogenated resins, monoammonia phosphate, melamine, pentaerythritol, etc. The theory and suggested formulas for making products fire retardant can be found in many texts on the subject or obtained from the manufacturer of one of the ingredients. Any of these techniques may be used to enhance fire retardant properties of the encapsulator of the present invention. Thorough testing is recommended since side effects are likely to occur. These side effects include increased smoke generation or toxic fume generation.

The encapsulating composition of the present invention is applied to flooring surfaces according to a single step application. It is unnecessary to mix separate components at a work site. The coating can be troweled on or applied with a roller or even simply poured on. The film has cold flow properties which can be enhanced or decreased by the percentages of water and thickeners in the composition.

The present invention will be more fully understood by the following examples:

EXAMPLE I

An asbestos encapsulating compound was prepared by mixing the various components together beginning with the liquids and ending by slowly adding pigment materials. The resulting material had the following composition:

| Ingredients | % By Weight |
|---|---|
| Polyvinyl Acetate Homopolymer Emulsion | 46.59% |
| Octylphenoxypolyetthoxyethanol | .14 |
| Sodium zinc phosphate inorganic polymer | .14 |
| Petroleum hydrocarbon | .27 |
| Dimethoxane | .14 |
| Ethylene Glycol | 2.43 |
| Ethylene glycol phenyl ether 90%) Diethylene glycol phenyl ether 10%) | .27 |
| Dipropylene glycol dibenzoate | .82 |
| Microspheres (white-ceramic) | 34.26 |
| Microspheres (red-ceramic) | 6.85 |
| Water | 8.09 |
| | 100.00% |

The above formulation has good volume solids.

A suspended flooring panel was coated with a 3/16" thick film of the encapsulator having the above composition. The panel was conditioned by allowing 7 days drying at ambient temperature and relative humidity. The coated panel was then subjected to 10 passes with a 400 lb. load on a crowned hard wheel having dimensions of 3" by 1 3/16". This weight normally ruins tile, but the encapsulator material of the above composition showed only minor indentation. Having passed the minimum requirement, the test was repeated using an 850 lbs. load. The panel by itself normally fails at 750 lbs. The encapsulator showed no signs of cracking and only minor indentations at 850 lbs.

Next, a static load test was run to determine the failure point of the encapsulator. Failure is defined as the point at which the film cracks. As long as the film does not crack, asbestos cannot escape. Up to 1200 psi, the compression noted could be attributed to the underlying tile. The weight was then increased to 5000 lbs. psi, the limit of the static load machine. There was some compression, but no sign of failure of the encapsulator coating. In practice, a load of 1000 psi is considered excessive and impractical. Accordingly, the encapsulator compound of the present invention provides a safety factor of at least about 5 times the maximum expected in service.

EXAMPLE II

Another encapsulating composition was mixed and prepared. The resulting encapsulant had the following composition:

| Ingredients | % By Weight |
|---|---|
| Ethylene Vinyl Acetate Emulsion | 46.6% |
| Octylphenoxypolyethoxyethanol | .1 |
| Sodium zinc phosphate inorganic polymer | .1 |
| Petroleum hydrocarbon | .4 |
| Dimethoxane | .1 |
| Ethylene glycol | 2.4 |
| Ethylene glycol phenyl ether 90% Diethylene glycol phenyl ether 10% | .3 |
| Dipropylene glycol dibenzoate | .3 |
| Microspheres (white-ceramic) | 33.9 |
| Microspheres (red-ceramic) | 6.8 |
| Water | 9.0 |
| | 100.00% |

The above formulation provides desirable results over a broad range of conditions. It contains a relatively soft resin with a good adhesion to vinyl.

EXAMPLE III

The following encapsulating composition was prepared:

| Ingredients | % By Weight |
|---|---|
| Carboxylated polychloroprene emulsion | 39.3% |
| Dispersed hydrocarbon resin (tackifier) | 4.0 |
| Dispersed zinc oxide (stabilizer) | 1.2 |
| Octylphenoxypolyethoxyethanol | .1 |
| Sodium zinc phosphate inorganic polymer | .1 |
| Petroleum hydrocarbon | .4 |
| Dimethoxane | .1 |
| Ethylene glycol | 2.3 |
| Ethylene glycol phenyl ether 90% Diethylene glycol phenyl ether 10% | .3 |
| Microspheres (white-ceramic) | 44.5 |
| Red iron oxide | 1.1 |
| Water | 6.6 |
| | 100.00% |

This formulation makes a uniform red coating instead of giving a dotted appearance. It is representitive of a formula which provides desired results over a broad range of conditions. This formula contains a Neoprene-type resin with good adhesion to vinyl. The double bonds (pi bonds) in this resin are said to tie up free asbestos.

The shelf life of this formulation depends upon the state of the art in manufacturing of the polychloroprene resin emulsion. For the present, the useful shelf life is roughly 6 months to 5 years, though this may change as the method of manufacturing the polychloroprene resin emulsion changes.

EXAMPLE IV

The following formulation is representitive of an encapsulating compound which would have poor flow and leveling. The lack of flow makes it well suited to application on inclined surfaces where a self leveling product may run. This formula contains a vinyl acrylic resin and a thickener.

| Ingredients | % By Weight |
|---|---|
| Acrylic emulsion (44% to 50% solids) | 43.0% |
| Octylphenoxypolyethoxyethanol | .1 |
| Sodium zinc phosphate inorganic polymer | .1 |
| Petroleum hydrocarbon | .4 |
| Dimethoxane | .1 |
| Ethylene glycol | 2.8 |
| Thickener | 5.8 |
| Ethylene glycol phenyl ether 90% Diethylene glycol phenyl ether 10% | .3 |
| Dipropylene glycol dibenzoate | .8 |
| Microspheres (white-ceramic) | 33.0 |
| Microspheres (red-ceramic) | 6.5 |
| Water | 7.1 |
| | 100.00% |

As previously noted, however, the protective coating can also be described by the list of qualities which are important to the final film. These qualities are:
a) a one step coating
b) a continuous coating
c) a strong yet flexible coating
d) a self-levelling coating
e) a coating which is not prone to cracking, and
f) a coating which can be applied in thin or thick coats.

I claim:

1. A method for coating a surface of flooring containing a hazardous material to encapsulate the hazardous material therein and to permit adhesion of a new layer of flooring thereon, comprising the steps of:
  applying a self-levelling encapsulating composition to a floor surface, the encapsulating composition including:
    about 40-55 parts by weight of a binder;
    about 2-7 parts by weight antifreeze;
    about 38-53 parts by weight hollow ceramic microspheres; and
    about 6-16 parts by weight water; and
  allowing the encapsulating composition to dry at ambient temperature.

2. A method for coating a surface of flooring containing a hazardous material to encapsulate the hazardous material therein and to permit adhesion of a new layer of flooring thereon, as set forth in claim 1, wherein the binder is a latex emulsion binder.

3. A method for coating a surface of flooring containing a hazardous material to encapsulate the hazardous material therein and to permit adhesion of a new layer of flooring thereon, as set forth in claim 2, wherein the binder is a polyvinyl acetate homopolymer emulsion.

4. A method for coating a surface of flooring containing a hazardous material to encapsulate the hazardous material therein and to permit adhesion of a new layer of flooring thereon, as set forth in claim 1, wherein the antifreeze is a glycol.

5. A method for coating a surface of flooring containing a hazardous material to encapsulate the hazardous material therein and to permit adhesion of a new layer of flooring thereon, as set forth in claim 1, wherein the hazardous material is asbestos.

6. A method for encapsulating asbestos flooring, comprising the steps of:
  mixing a coating composition comprising a polymeric binder, ceramic microspheres, antifreeze and water;
  coating the asbestos flooring with the coating composition;
  flowing the coating composition along a surface of the asbestos flooring to form a continuous laminate of the coating composition on said flooring; and
  encapsulating the asbestos within said flooring.

7. A method for encapsulating asbestos flooring, according to claim 6, further including a step of allowing the coating composition to dry.

8. A method for encapsulating asbestos flooring, according to claim 6, further including a step of modifying the coating composition for use on inclined surfaces.

9. A method for coating a surface, comprising the step of:
  applying a premixed coating composition to the surface, the composition including:
    about 40-55 parts by weight of a binder;
    about 2-7 parts by weight antifreeze;
    about 38-53 parts by weight hollow ceramic microspheres; and
    about 6-16 parts by weight water.

10. A method for encapsulating asbestos flooring, according to claim 6, wherein the coating composition comprises about 40-55 parts by weight of a binder; about 2-7 parts by weight antifreeze; about 38-53 parts by weight hollow ceramic microspheres; and about 6-16 parts by weight water.

11. A method for encapsulating asbestos flooring, according to claim 6, wherein the coating composition dries to withstand a pressure of 5000 psi without failure.

12. A method for encapsulating asbestos flooring, according to claim 6, wherein the coating composition is premixed and applicable in a single step.

13. A method for encapsulating asbestos flooring, according to claim 6, wherein the coating sets firm in about four hours.

14. A method for coating a surface, according to claim 9, including the additional step of:
  drying the coating at ambient temperature and relative humidity.

15. A method for coating a surface of flooring containing a hazardous material to encapsulate the hazardous material therein and to permit adhesion of a new layer of flooring thereon, as set forth in claim 6, wherein the binder is polyvinyl acetate homopolymer emulsion.

16. A method for coating a surface of flooring containing a hazardous material to encapsulate the hazardous material therein and to permit adhesion of a new layer of flooring thereon, as set forth in claim 2, wherein the binder is selected from the group consisting of polychloroprene, acrylics, ethylene vinyl acetate, vinyl acrylic, acrylonitrile, terpolymers and copolymeric compositions.

17. A method for coating a surface of flooring containing a hazardous material to encapsulate the hazardous material therein and to permit adhesion of a new layer of flooring thereon, as set forth in claim 1, wherein the flooring to which the encapsulating composition is applied includes vinyl, cement or wood.

18. A method for coating a surface of flooring containing a hazardous material to encapsulate the hazardous material therein and to permit adhesion of a new layer of flooring thereon, as set forth in claim 1, wherein the ceramic microspheres act as ball bearings in providing the encapsulating composition with flexibility.

* * * * *